UNITED STATES PATENT OFFICE.

JACOB HEINRICH HESS, OF GRIESHEIM, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

PRODUCTION OF ANHYDROUS ETHYL ALCOHOL.

996,763.  Specification of Letters Patent.  Patented July 4, 1911.

No Drawing.  Application filed November 25, 1910.  Serial No. 594,208.

*To all whom it may concern:*

Be it known that I, JACOB HEINRICH HESS, a subject of the German Emperor, and resident of Griesheim-on-the-Main, Germany, have invented certain new and useful Improvements in the Production of Anhydrous Ethyl Alcohol, of which the following is a specification.

The present invention consists in a process for manufacturing anhydrous ethyl-alcohol.

While it is known that other alcohols can by fractional distillation easily be brought into the anhydrous state it is, even with the best column apparatus, not possible to get an ethyl-alcohol of a concentration of more than 96%. For the elimination of the remaining water many dehydrating substances have been proposed which after a rather long action attain the desired result. As a most practical dehydrating substance caustic lime has been proposed. But this seemingly cheap dehydrator becomes very expensive inasmuch as its use causes considerable losses of alcohol, because, if the alcohol is distilled off immediately after the dehydration only 67% of the initial quantity is obtained, and if, after the dehydration, the alcohol is left in contact with the lime during 24 hours only 61% is obtained. It has also been proposed to effect the dehydration by means of metallic sodium, metallic calcium, barium-oxid, molten chlorid of calcium or anhydrous sulfate of copper. The first four of these substances, however have the above noted disadvantages of caustic lime inasmuch as they combine with the alcohol causing thereby considerable losses of alcohol. As for the anhydrous sulfate of copper, it acts only if it is present in great excess and even in this case there is a loss of alcohol.

Now I have found that sodium-sulfid ($Na_2S$) free from water is a much better dehydrating substance than any of those mentioned. Over the same it has the following advantages viz: 1st, it is quite indifferent against ethyl-alcohol; 2nd, therefore all of the alcohol can be recovered in a concentrated state of practically 100%; 3rd, it dehydrates the ethyl-alcohol perfectly within a very short time; 4th, after the anhydrous ethyl-alcohol has been distilled off, the remaining sulfid can, by simply heating, be freed from the water it has absorbed and can so be used over and over again.

The following simple experiment will demonstrate the truth of the above statements as to efficiency of the herein described process. Take a glass vessel having a capacity of about three liters and provided with a stirring means and a reflux cooler and place therein 1.2 kilograms of ethyl-alcohol containing 93 to 94 per cent. alcohol. To this alcohol add 450 grams of anhydrous sodium sulfid ($Na_2S$). The temperature of the liquid will be raised to 55 to 60° centigrade by the addition of the sodium sulfid. Then boil the mixture in a vessel provided with a reflux cooler for one half an hour stirring it at the same time and thereafter distil off the alcohol. It will be found that 1.1 kilograms of alcohol will be recovered so that there has been a loss of only 1.4 per cent. The sodium sulfid remaining in the distilled vessel can be readily separated from the water.

I claim:

The herein described process of making anhydrous ethyl-alcohol by mixing watery ethyl-alcohol with dry sodium sulfid boiling the mixture and distilling off from the sulfid the so obtained anhydrous alcohol.

In testimony whereof I have signed my name to this specification in the presence of two subscribing witnesses.

JACOB HEINRICH HESS.

Witnesses:
    FRANZ HASSLACHER,
    ERWIN DIPPEL.